(12) United States Patent
Neufert

(10) Patent No.: US 6,216,755 B1
(45) Date of Patent: Apr. 17, 2001

(54) METHOD AND DEVICE FOR FILLING CONTAINERS

(75) Inventor: Ronald Neufert, Michelau (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/364,897

(22) Filed: Aug. 2, 1999

(30) Foreign Application Priority Data

May 3, 1999 (DE) ............................................. 199 20 234
Jul. 31, 1999 (DE) ............................................. 198 34 671

(51) Int. Cl.$^7$ ........................... B65B 1/04; B65B 3/00; B67C 3/00
(52) U.S. Cl. ........................ 141/392; 141/9; 141/59; 141/100; 141/237; 141/285; 141/292; 141/382; 137/256
(58) Field of Search ............................ 141/2, 9, 59, 99, 141/100, 104, 234, 237, 311 R, 285, 291, 292, 301, 302, 382, 392; 137/255, 256

(56) References Cited

U.S. PATENT DOCUMENTS

| | | | |
|---|---|---|---|
| 3,324,905 | * 6/1967 | Paulo | 141/100 |
| 3,502,117 | * 3/1970 | Nebelsiek et al. | 141/7 |
| 3,871,422 | * 3/1975 | Elson et al. | 137/231 |
| 5,123,458 | * 6/1992 | Collard | 141/1 |
| 5,775,386 | * 7/1998 | Connan | 141/103 |

OTHER PUBLICATIONS

"SINOx Stickoxidminderung für stationäre Dieselmotoren", Order No. A96001–U91–A232, Siemens AG, Berlin and Munich.

* cited by examiner

Primary Examiner—Timothy L. Maust
(74) Attorney, Agent, or Firm—Herbert L. Lerner; Laurence A. Greenberg; Werner H. Stemer

(57) ABSTRACT

A device for simultaneously filling a container serving as a fuel tank and a container serving as a reducing-agent container with a single pump nozzle is used for environmentally friendly internal combustion engines with exhaust-gas purification systems requiring both tanks which are to be refilled repeatedly. Filler necks of the containers as well as outlet pipes disposed in the pump nozzle and assigned to the filler necks, are combined. A method for filling the containers is also provided.

15 Claims, 1 Drawing Sheet

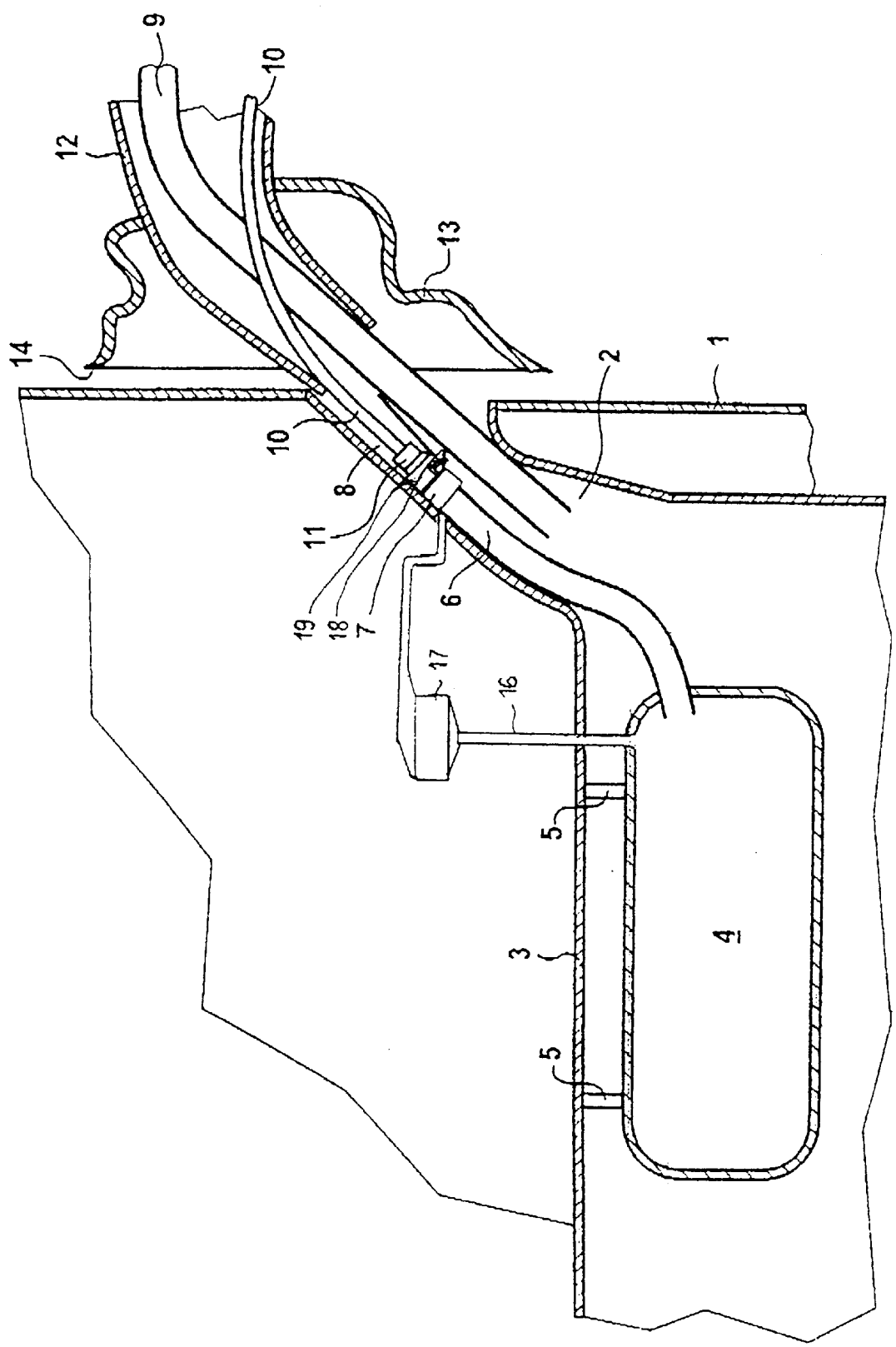

METHOD AND DEVICE FOR FILLING CONTAINERS

BACKGROUND OF THE INVENTION

Field of the Invention

The invention relates to a method for filling two containers of a system, in particular for filling a fuel tank and a reducing-agent tank surrounded by the latter. The invention also relates to a device for carrying out the method.

Exhaust-gas purification systems operated with a reducing agent have been developed in the course of the development of ever more environmentally friendly internal combustion engines. A system of that kind is known, for example, from a Siemens Company Prospectus entitled "SiNOx Nitrogen Oxide Reduction for Stationary Diesel Engines", Order No. A96001-U91-A232, Siemens AG, Berlin and Munich. That document relates to a system which is based on an SCR (Selective Catalytic Reduction) method. That method makes use of the effect whereby nitrogen oxides or urea are converted into nitrogen and water through the use of suitable catalysts. For that purpose, exhaust gases are led through the SCR catalyst, which is integrated into an exhaust-gas line, at the same time as an accurately metered addition of a reducing agent.

In an exhaust-gas purification system which is operated with a reducing agent and which cooperates with an internal combustion system supplying exhaust gas, for example with a diesel engine in a motor vehicle, it is necessary for the reducing agent to be stored in a storage container, tank or reducing-agent space. That space has heretofore been disposed at some distance and separately from the fuel space, which is provided for storing the fuel for the internal combustion system. In that case, a solid reducing agent such as urea, for example, is dissolved in a liquid, for example in water, inter alia, for reasons of good meterability. Reducing agent solutions of that kind crystallize and solidify at temperatures below which those prevailing in the vehicle, and if the reducing-agent tank is installed externally, may fall. For example, a 32.5% urea/water solution solidifies at −11° C. A frozen or solidified solution can no longer be conveyed, and in such a case the exhaust gas is not purified.

Particularly in the case of a vehicle in which such an exhaust-gas purification system operated by reducing agent is employed, there is a need to accommodate the storage container for the reducing agent. German Published, Non-Prosecuted Patent Application DE 197 29 003 A1 recently proposed to place the storage container for the reducing agent within a fuel tank belonging to the internal combustion system. In that case, spatially separated filler orifices which are independent of one another are provided for filling the storage container and the fuel tank. Storage tanks from which fuel and reducing agent are pumped are normally installed spatially at a distance from one another. Two refueling operations that are independent of one another are therefore necessary in order to refuel an internal combustion system of the above-mentioned type.

SUMMARY OF THE INVENTION

It is accordingly an object of the invention to provide a method and a device for filling containers, which overcome the hereinafore-mentioned disadvantages of the heretofore-known methods and devices of this general type and which are made more acceptable by reducing time spent in filling or refueling.

With the foregoing and other objects in view there is provided, in accordance with the invention, a method for filling two containers, in particular for filling a fuel tank and a reducing-agent tank surrounded by the fuel tank, in a system, which comprises simultaneously filling the two containers with a single pump nozzle having two outlet pipes.

In accordance with another mode of the invention, the filling of at least one of the two containers is carried out through a liquid-tight and/or gas-tight connection and venting is carried out, during a filling operation, through a vent opening parallel to a connection provided for filling, with gases emerging from the vent opening being filtered. Moreover, at the same time, gases possibly displaced out of one of the containers and emerging through a filler neck are received by a suction-extraction device.

With the objects of the invention in view there is also provided a filling device, comprising two containers and two filler necks each associated with a respective one of the containers, the filler necks combined to form a subassembly; and a single pump nozzle having two outlet pipes each assigned to a respective one of the filler necks for simultaneously filling the two containers, the outlet pipes combined to form a subassembly.

In accordance with another feature of the invention, the connections have line cross sections of different sizes, the connection having the smaller line cross section is constructed to be liquid-tight and/or gas-tight, the outlet pipes in the pump nozzle have different lengths, and the shorter outlet pipe has the smaller line cross section.

In accordance with a further feature of the invention, the containers respectively serve as a fuel tank and as a reducing-agent tank in a motor vehicle, with the longer outlet pipe serving for filling the fuel tank, for example with diesel fuel, and the shorter outlet pipe serving for filling the reducing-agent tank, for example with a urea solution.

In accordance with an a concomitant feature of the invention, both the shorter outlet pipe in the pump nozzle and the associated container-side filler neck are provided in each case with a self-closing device opening only when the outlet pipe is introduced in the filler neck. In this case, the self-closing devices are constructed in the manner of a bayonet fastening, and the container-side filler neck having the smaller line cross section is disposed at the bottom of a guide cone. Moreover, the pump nozzle, together with its two outlet pipes, is surrounded by a suction bell.

The advantages achieved through the use of the invention are, in particular, that the simultaneous filling of the two containers (tanks) markedly reduces the amount of time required for filling both containers, and that associated drawbacks, for example the user getting dirty, are reduced to a tolerable or even negligible minimum.

Other features which are considered as characteristic for the invention are set forth in the appended claims.

Although the invention is illustrated and described herein as embodied in a method and a device for filling containers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a fragmentary, diagrammatic, sectional view illustrating a situation in a container-side region of filler necks when a pump nozzle has been introduced therein.

DESCRIPTION OF THE PREFERRED EMBODIMENTS

Referring now in detail to the single FIGURE of the drawing, there is seen a side wall 1 of a motor vehicle, which is not illustrated in any greater detail. A filler neck 2 of an only partially illustrated container 3 for diesel fuel opens out on the side wall 1. A container 4 is provided within the container 3 for a reducing agent, for example for an aqueous solution of urea. In the exemplary embodiment, the container 4 is suspended on struts 5 below an upper wall of the container 3.

The container 4 is aerated and vented through a connecting line 16, which opens into a filter configuration 17. A filler neck 6 for the container 4 is led along an upper wall of the filler neck 2 in the latter and terminates in a self-closing device 7. The self-closing device 7 is constructed as a bayonet fastening and is held in a bottom of a guide cone 8.

The bayonet fastening of the line 10 is indicated by a cylindrical shell which has an approximately U-shaped slit. With regard to the bayonet fastening of the line 6, only a laterally extending pin 18 can be seen in the filter which is attached on a ring that is inserted into a shell 19 at the end of the line 6. This ring is pushed upwardly with the force of an inner spring. However, it can be moved against the spring force as soon as the pin is inserted into a leg of the U-shaped slit and as soon as the bayonet fastening is moved downwardly with the shell 19 by pressure applied on the pump nozzle 12. Rotation of the pump nozzle 12 by approximately 300 causes the pin 18 to reach into the other leg of the U-shaped slit of the shell 19 where it is locked in place.

An outlet pipe 9 for diesel fuel is introduced into the filler neck 2. An outlet pipe 10 for the reducing agent is disposed fluidically parallel to the outlet pipe 9. A free end of the outlet pipe 10 is provided with a self-closing device 11, which again is constructed as a bayonet fastening in a manner that is not illustrated in any greater detail. The two outlet pipes 9 and 10 are combined in a single pump nozzle 12, which carries a suction bell 13 surrounding them.

In order to initiate the filling of the containers 3 and 4, the pump nozzle 12 is introduced into the filler neck 2 until the device 11 penetrates into the device 7 and makes a liquid-tight and gas-tight connection between the outlet pipe 10 and the filler neck 6. In this position, the outlet pipe 9 projects well into the filler neck 2 and the suction bell 13 rests with a very soft peripheral lip 14 against the side wall 1. Elements 13 and 14 together form a suction-extraction device. Valves in the pump nozzle 12 are then opened, so that simultaneously fuel flows through the outlet pipe 9 into the container 3 and reducing agent flows through the outlet pipe 10 into the container 4.

Each of the valves is equipped with a conventional automatic mechanism which prevents one of the containers 3 or 4 from being overfilled. However, the valves may also be actuated individually by hand, so that the filling of the containers 3 and 4 can be discontinued individually and at any desired filling level. As long as one of the valves is open and the suction bell 13 rests against the side wall 1, a pressure which is lower than ambient pressure is maintained in the suction bell 13 through a non-illustrated line. In this way, gas displaced out of the container 3 or vapors which have possibly emerged due to a leak at the device 7 or 11 are suction-extracted and do not pass into the ambient air.

The filling operation is terminated by closing off all of the valves in the pump nozzle 12, and the pump nozzle 12 is drawn out of the filler neck 2. At the same time, the self-closing devices 7 and 11 are also detached from one another and, by closing automatically, prevent reducing agent from emerging from the filler neck 6 or from the outlet pipe 10.

The method and the device which is specified for carrying it out may advantageously be employed in all cases in which more than one substance is to be supplied to a system. This method and device are, in particular, not restricted to being used in the case of two containers to be filled, but are also suitable for the simultaneous filling of more than two containers.

I claim:

1. A filling device in a motor vehicle, comprising:

a fuel tank associated with a first filler neck and a reducing-agent tank associated with a second filler neck, said filler necks combined to form a subassembly; and a single pump nozzle having two outlet pipes each assigned to a respective one of said filler necks for simultaneously filling said fuel tank and said reducing-agent tank, said outlet pipes combined to form a subassembly.

2. The device according to claim 1, wherein one of said two filler necks and one of said two outlet pipes form one connection, another of said two filler necks and another of said two outlet pipes form another connection, said connections include a connection with a larger and a connection with a smaller line cross section, and said connection with said smaller line cross section is at least one of liquid-tight and gas-tight.

3. The device according to claim 1, wherein said outlet pipes in said pump nozzle have different lengths.

4. The device according to claim 1, wherein said outlet pipes in said pump nozzle include a longer outlet pipe and a shorter outlet pipe, and said shorter outlet pipe has a smaller line cross section than said longer outlet pipe.

5. The device according to claim 1, wherein said outlet pipes in said pump nozzle include a longer outlet pipe for filling the fuel tank and a shorter outlet pipe for filling the reducing-agent tank.

6. The device according to claim 1, wherein said outlet pipes in said pump nozzle include a longer outlet pipe for filling the fuel tank with diesel fuel and a shorter outlet pipe for filling the reducing-agent tank with a urea solution.

7. The device according to claim 1, wherein said outlet pipes in said pump nozzle include a longer outlet pipe and a shorter outlet pipe, and said shorter outlet pipe and said filler neck associated with said shorter outlet pipe each have a respective self-closing device opening only when said shorter outlet pipe is introduced into said associated filler neck.

8. The device according to claim 7, wherein said self-closing devices have a bayonet fastening.

9. The device according to claim 1, including a guide cone having a bottom, said filler necks including a filler neck with a larger line cross section and a filler neck with a smaller line cross section, and said filler neck with said smaller line cross section disposed at said bottom of said guide cone.

10. The device according to claim 1, including a suction bell surrounding said pump nozzle together with said two outlet pipes.

11. In a method for filling two containers of a system, the improvement which comprises:

simultaneously filling the two containers with a single pump nozzle having two outlet pipes by filling through a filling connection; and venting during the filling step through a vent opening parallel to the filling connection.

12. The method according to claim 1, which comprises carrying out the filling step by filling at least one of the two containers through at least one of a liquid-tight and gas-tight connection.

13. The method according to claim 11, which comprises filtering gases emerging from the vent opening.

14. The method according to claim 11, which comprises guiding gases displaced out of one of the containers during the filling step to a suction-extraction device.

15. In a method for filling a fuel tank and a reducing-agent tank surrounded by the fuel tank in a system, the improvement which comprises:

simultaneously filling the fuel tank and the reducing-agent tank with a single pump nozzle having two outlet pipes.

* * * * *